US010443829B2

(12) United States Patent
Wright et al.

(10) Patent No.: US 10,443,829 B2
(45) Date of Patent: *Oct. 15, 2019

(54) EDGE-LIT LIGHTING DEVICE

(71) Applicant: Eaton Intelligent Power Limited, Dublin (IE)

(72) Inventors: Timothy Glen Wright, Peachtree City, GA (US); Adam Moore Foy, Parker, CO (US); Eric Allyn Snyder, Fayetteville, GA (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 15/901,625

(22) Filed: Feb. 21, 2018

(65) Prior Publication Data

US 2018/0195705 A1 Jul. 12, 2018

Related U.S. Application Data

(63) Continuation of application No. 15/186,122, filed on Jun. 17, 2016, now Pat. No. 9,915,417, which is a continuation of application No. 14/011,446, filed on Aug. 27, 2013, now Pat. No. 9,374,869.

(51) Int. Cl.
F21V 8/00 (2006.01)
F21V 23/04 (2006.01)
H05B 33/08 (2006.01)
H05B 37/02 (2006.01)
(Continued)

(52) U.S. Cl.
CPC ........ *F21V 23/0471* (2013.01); *G02B 6/0068* (2013.01); *G02B 6/0073* (2013.01); *G02B 6/0091* (2013.01); *H05B 33/0854* (2013.01); *H05B 37/02* (2013.01); *H05B 37/0209* (2013.01); *F21Y 2105/18* (2016.08); *F21Y 2115/10* (2016.08); *H05B 37/0218* (2013.01); *H05B 37/0227* (2013.01)

(58) Field of Classification Search
CPC ............... F21V 23/0471; G02B 6/0068; F21Y 2105/18; F21Y 2115/10
See application file for complete search history.

(56) References Cited

U.S. PATENT DOCUMENTS 6,443,582 B1 * 9/2002 Tarne ..................... G02B 6/003
362/23.16
2002/0048169 A1 * 4/2002 Dowling ............ H05B 33/0857
362/234
(Continued)

Primary Examiner — Mary Ellen Bowman
(74) Attorney, Agent, or Firm — King & Spalding LLP

(57) ABSTRACT

A circular edge-lit lighting device includes a light emitting panel (LEP) and a first light emitting diode (LED) light source positioned proximal to a first location on a narrow outer perimeter edge of the LEP. The first LED light source is configured to emit a first light into the LEP through the narrow outer perimeter edge. The first light has a first intensity level. The circular edge-lit lighting device also includes a second LED light source positioned proximal to a second location on the narrow outer perimeter edge the LEP. The second LED light source is configured to emit a second light into the LEP through the narrow outer perimeter edge. The second light has a second intensity level. The first location and the second location are different locations.

20 Claims, 8 Drawing Sheets

(51) Int. Cl.
*F21Y 105/18* (2016.01)
*F21Y 115/10* (2016.01)

(56) References Cited

U.S. PATENT DOCUMENTS

| | | | |
|---|---|---|---|
| 2011/0227487 A1* | 9/2011 | Nichol | G02B 6/0018 315/158 |
| 2012/0105498 A1* | 5/2012 | Kim | G09G 3/3426 345/690 |
| 2014/0355297 A1* | 12/2014 | Castillo | G02B 6/0035 362/582 |

* cited by examiner

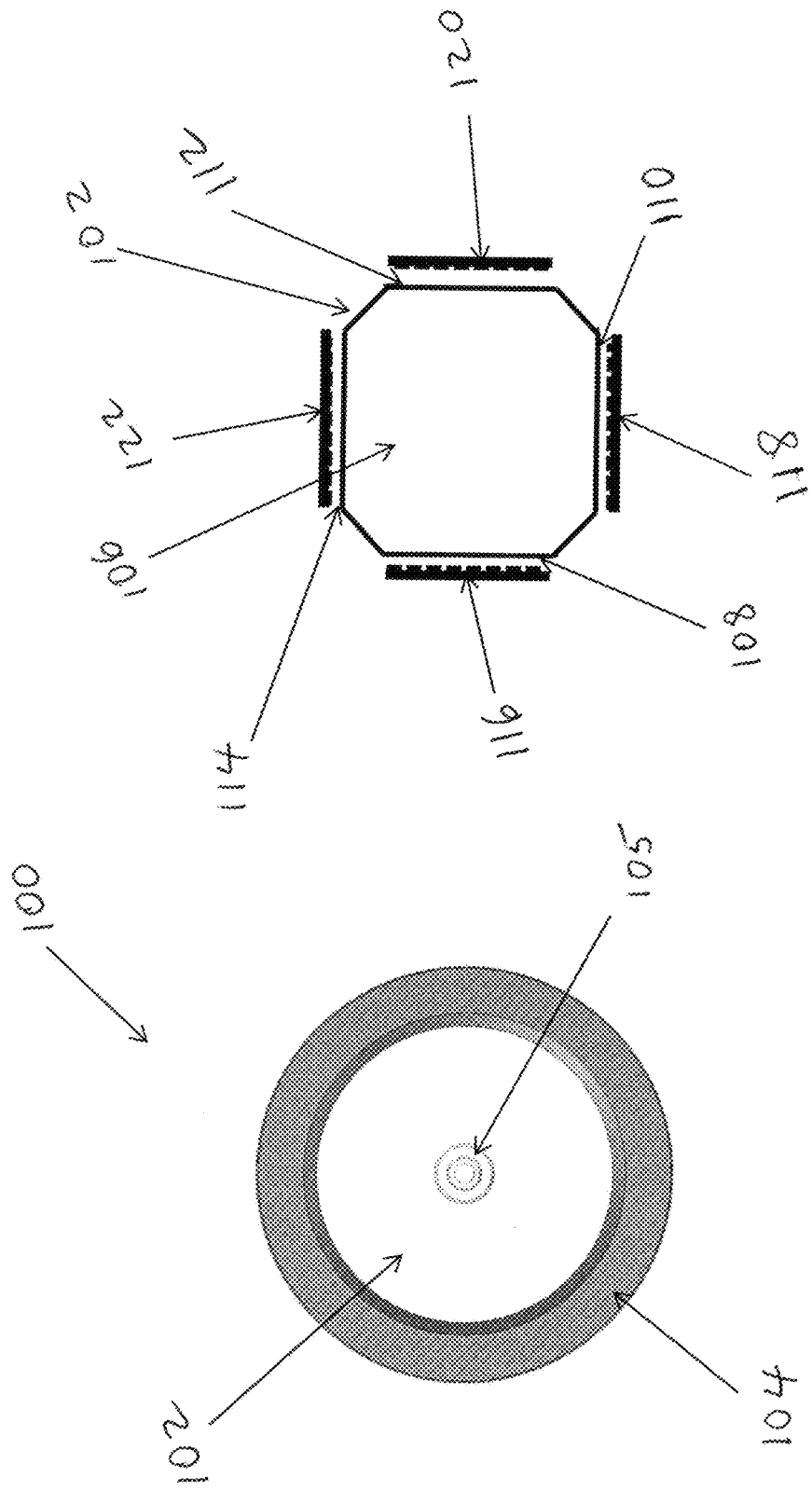

EDGE-LIT LIGHTING DEVICE

CROSS-REFERENCE TO RELATED APPLICATIONS

The present application is a continuation of and claims priority to U.S. Nonprovisional patent application Ser. No. 15/186,122, filed Jun. 17, 2016, and titled "Edge-Lit Lighting Device," which claims priority to U.S. Nonprovisional patent application Ser. No. 14/011,446, filed Aug. 27, 2013, and titled "Light Distribution Control of an Edge-Lit Lighting Device," the entire contents of the foregoing applications are hereby incorporated herein by reference.

TECHNICAL FIELD

The present disclosure relates generally to light distribution control, in particular to light distribution control of an edge-lit lighting device.

BACKGROUND

Edge-lit lighting fixtures include a light emitting panel (LEP) that emits light through a broad side of the LEP. For example, the lighting fixture may include a light source, such as a light emitting diode (LED), that is positioned close to one of the multiple narrow sides of the LEP. Light from the light source may enter the LEP through a narrow side of the LEP. The light from the light source that enters the LEP through the narrow side of the LEP may be emitted by the LEP through the broad side of the LEP to illuminate a space around the lighting fixture. Distribution pattern of the light emitted by the LEP of the lighting fixture may depend on, for example, the intensity of the light that is emitted by the light source and that enters the narrow side of the LEP. The distribution pattern of the light emitted by the LEP may also depend on the particular narrow side of multiple narrow sides of the LEP through which the light from the light source enters the LEP.

In some cases, the distribution pattern of light emitted by a standard edge-lit lighting fixture may not be desirable for some applications and/or situations. For example, an edge-lit lighting fixture that emits light that equally illuminates all parts of area around the lighting fixture may not be desirable. To illustrate, a series of lighting fixtures may be powered to provide lighting for a parking (deck) garage. However, it may be undesirable for the light to illuminate areas outside of the parking garage. To avoid illuminating some areas around the lighting fixtures, the lighting fixtures may need to include structures such as inserts and/or shields. Furthermore, not only illumination of some areas around the lighting fixture may be undesirable, the need for illumination of an area around the lighting fixture may change based on particular situations. For example, an area around the lighting fixture may need to be illuminated only when the area is occupied.

Accordingly, a lighting device that can be set and/or adjusted to emit light that has a particular distribution pattern may be desirable.

SUMMARY

In general, the present disclosure relates to light distribution control of an edge-lit lighting device. In an example embodiment, an edge-lit lighting device includes a light emitting panel (LEP), a first plurality of light sources, and a second plurality of LEDs. The first plurality of light sources are positioned proximal to a first narrow side of the LEP and are configured to emit a first light into the LEP through the first narrow side. The first light has a first intensity level. The second plurality of LEDs are positioned proximal to a second narrow side of the LEP and are configured to emit a second light into the LEP through the second narrow side. The second light has a second intensity level that is different from the first intensity level. The first intensity level and the second intensity level are set to achieve a particular distribution pattern of an output light emitted out through a broad side of the LEP.

In another example embodiment, an edge-lit lighting device includes a light emitting panel (LEP), a first plurality of light sources, and a second plurality of light sources. The first plurality of LEDs are positioned proximal to a first narrow side of the LEP and are configured to emit a first light into the LEP through the first narrow side. The first light has a first intensity level. The second plurality of LEDs are positioned proximal to a second narrow side of the LEP and are configured to emit a second light into the LEP through the second narrow side. The second light has a second intensity level. The LEP is configured to emit out an output light through a broad side of the LEP. The first intensity level and the second intensity level of the second light are adjustable. The distribution pattern of the output light is changeable by adjusting one of the first intensity level and the second intensity level.

In another example embodiment, a method of controlling light distribution of an edge-lit lighting device includes installing an edge-lit lighting device that includes a light emitting panel (LEP), a first plurality of light sources positioned proximal to a first narrow side of the LEP and configured to emit a first light into the LEP through the first narrow side, and a second plurality of light sources positioned proximal to a second narrow side of the LEP and configured to emit a second light into the LEP through the second narrow side. The method further includes setting an intensity level of the first light, and setting an intensity level of the second light.

In another example embodiment, an edge-lit lighting device includes a light emitting panel (LEP) having a broad side and a plurality narrow sides. The edge-lit lighting device further includes multiple light sources. Each of the multiple light sources is positioned proximal to a respective narrow side of the plurality of narrow sides and oriented to emit a respective light into the LEP through the respective narrow side of the plurality of narrow sides. A distribution of an output light emitted out through the broad side of the LEP is changeable by powering on at least one light source of the multiple light sources that are powered off and by powering off one or more light sources of the multiple light sources that are powered on.

These and other aspects, objects, features, and embodiments will be apparent from the following description and the claims.

BRIEF DESCRIPTION OF THE DRAWINGS

Reference will now be made to the accompanying figures, which are not necessarily to scale, and wherein:

FIGS. 1A and 1B illustrates a lighting device including a light emitting panel (LEP) in accordance with an example embodiment;

Figure 2B:
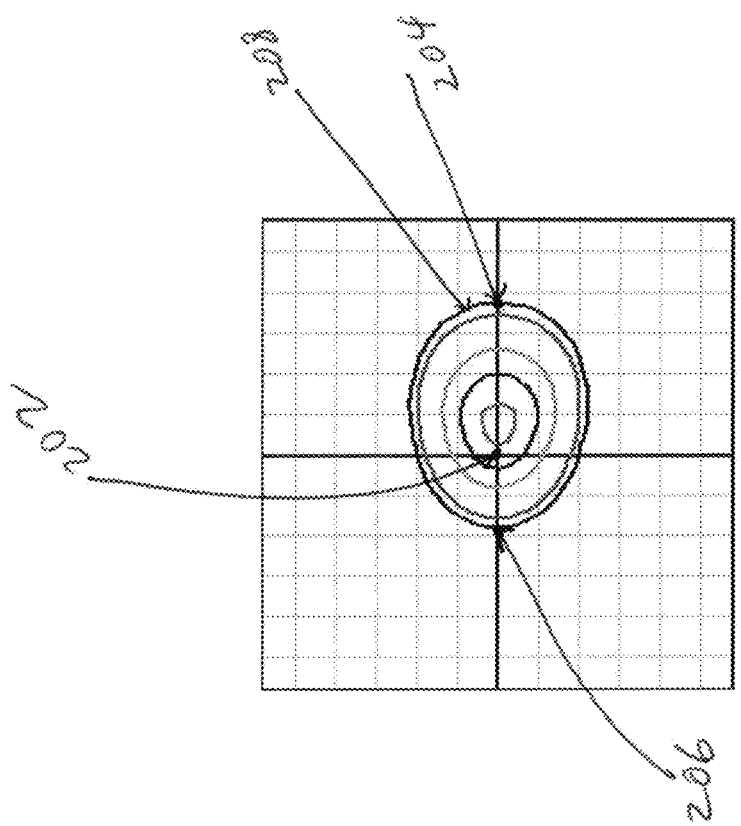
FIG. 2B illustrates an Iso-footcandle plot that corresponds to the lighting device of FIG. 2A in accordance with an example embodiment.

The drawings illustrate only example embodiments and are therefore not to be considered limiting in scope. The elements and features shown in the drawings are not necessarily to scale, emphasis instead being placed upon clearly illustrating the principles of the example embodiments. Additionally, certain dimensions or placements may be exaggerated to help visually convey such principles. In the figures, reference numerals designate like or corresponding, but not necessarily identical, elements.

DETAILED DESCRIPTION OF THE EXAMPLE EMBODIMENTS

In the following paragraphs, particular embodiments will be described in further detail by way of example with reference to the figures. In the description, well known components, methods, and/or processing techniques are omitted or briefly described. Furthermore, reference to various feature(s) of the embodiments is not to suggest that all embodiments must include the referenced feature(s).

Turning now to the drawings, example embodiments are described. FIGS. 1A and 1B illustrate a lighting device including a light emitting panel (LEP) in accordance with an example embodiment. The lighting device 100 may be set and/or adjusted to emit an output light that has a desired light distribution pattern. For example, the lighting device 100 may emit light such that a portion of an area around the lighting device 100 is relatively highly illuminated by the light while another portion of the area is dimly illuminated.

The lighting device 100 includes the LEP 102 and a frame 104. In some example embodiments, the lighting device 100 may also include an optional sensor 105. The LEP 102 may be made from an acrylic material, glass, or another suitable material, that allows light to enter through one or more narrow sides of the LEP 102 and to be emitted through one or more broad sides of the LEP 102. The LEP 102 may have an octagonal shape as illustrated in FIG. 1B. The LEP 102 includes a broad side 106 and eight narrow sides. The eight narrow sides may have substantially equal dimensions. Alternatively, each of the eight narrow sides may have one or more dimensions that are different respective one or more dimensions of some or all other narrow sides of the eight narrow sides. In some example embodiments, the LEP 102 may include grooves on the broad side 106. The LEP 102 also includes a second broad side that is opposite the broad side 106. The second broad side may be covered with a reflector that reflects light toward the broad side 106. The second broad side may also include grooves.

The lighting device 100 includes four sets of light sources 116, 118, 120, 122, which are referred to as four sets of light emitting diodes (LEDs) 116, 118, 120, 122, hereinafter. However, the four sets of light sources 116, 118, 120, 122 may be light sources other than LEDs. Further, the terms LED and LEDs as used herein may refer to discrete LED or LEDs, one or more organic light-emitting diodes (OLEDs), an LED chip on board that includes one or more discrete LEDs, an array of discrete LEDs, or light source(s) other than LEDs. Further, each set of light sources 116, 118, 120, 122 may be a single light source. Continuing with FIG. 1, the four sets of LEDs 116, 118, 120, 122 are each positioned close to a corresponding narrow side 108, 110, 112, 114 of the LEP. To illustrate, a first set of LEDs 116 is positioned close to a first narrow side 108 of the LEP 102. A second set of LEDs 118 is positioned close to a second narrow side 110 of the LEP 102. A third set of LEDs 120 is positioned close to a third narrow side 112 of the LEP 102. A fourth set of LEDs 122 is positioned close to a fourth narrow side 114 of the LEP 102. In some example embodiments, the sets of LEDs 116, 118, 120, 122 are disposed on a respective printed circuit board (PCB).

As illustrated in FIG. 1B, the first set of LEDs 116 is positioned opposite to the third set of LEDs 120, and adjacent to the second set of LEDs 118 and to the fourth set of LEDs 122. Similarly, the second set of LEDs 118 is positioned opposite to the fourth set of LEDs 122, and adjacent to the first set of LEDs 116 and to the third set of LEDs 120.

In some example embodiments, the first set of LEDs 116 are configured to emit light toward the first narrow side 108 of the LEP 102. The second set of LEDs 118 are configured to emit light toward the second narrow side 110 of the LEP 102. The third set of LEDs 120 are configured to emit light toward the third narrow side 112 of the LEP 102. The fourth set of LEDs 122 are configured to emit light toward the fourth narrow side 114 of the LEP 102.

The lighting device 100 may illuminate an area around the lighting device with a light emitted through the broad side 106 of the LEP 102. The lighting device 100 may emit a light through the broad side 106 of the LEP 102 based on one or more lights from the four sets of LEDs 116, 118, 120, 122. For example, if all four sets of LEDs 116, 118, 120, 122 are powered on, the light emitted by the lighting device 100 through the broad side 106 of the LEP 102 is based on the light from each of the four sets of LEDs 116, 118, 120, 122. As another example, if only two of the four sets of LEDs are powered on, the light emitted by the lighting device 100 through the broad side 106 of the LEP 102 is based on the lights from the two sets of LEDs that are powered. As yet another example, if only one of the four sets of LEDs is powered on, the light emitted by the lighting device 100 through the broad side 106 of the LEP 102 is based only on the light from the particular set of LEDs that are powered on.

The distribution pattern of the light emitted through the broad side 106 of the LEP 102 may depend on the particular set of LEDs that are powered on or off. For example, the distribution pattern of the light emitted through the broad side 106 of the LEP 102 is different when only the first set of LEDs 116 and the second set of LEDs 118 are powered on as compared to when only the first set of LEDs 116 and the third set of LEDs 120 are powered on. As another example, the distribution pattern of the light emitted through the broad side 106 of the LEP 102 is different when only the first set of LEDs 116 and the second set of LEDs 118 are powered on as compared to when only the second set of LEDs 118 and the fourth set of LEDs 120 are powered on.

For a fixed orientation of the lighting device 100, the distribution pattern of the light emitted through the broad side 106 of the LEP 102 is different when only the first set of LEDs 116 and the second set of LEDs 118 are powered on as compared to when only the second set of LEDs 118 and the third set of LEDs 120 are powered on. Similarly, for a fixed orientation of the lighting device 100, the distribution pattern of the light emitted through the broad side 106 of the LEP 102 is different when only the first set of LEDs 116 and the third set of LEDs 120 are powered on as compared to when only the second set of LEDs 118 and the fourth set of LEDs 122 are powered on. Thus, the distribution pattern of the light emitted through the broad side 106 may be changed by powering on one or more of the sets of LEDs 116, 118, 120, 122 and powering of the remaining sets of LEDs 116, 118, 120, 122. By changing the particular one or more of the sets of LEDs 116, 118, 120, 122 that are powered on, the distribution pattern of the light emitted through the broad side 106 can be changed.

Further, the distribution pattern of the light emitted through the broad side 106 of the LEP 102 may also depend on the intensity of light from each of the sets of LEDs 116, 118, 120, 122. In some example embodiments, the intensity of light from each powered-on set of LEDs 116, 118, 120, 122 may be adjusted to various levels ranging between approximately zero intensity corresponding to no light being emitted (i.e., substantially equivalent to being powered off) and the maximum intensity of light that can be emitted by the particular set of LEDs 116, 118, 120, 122. In some example embodiments, intensity level of light emitted by each one of the sets of LEDs 116, 118, 120, 122 may be set or adjusted to zero by powering off the particular set of LEDs. The intensity of light from each one of the sets of LEDs 116, 118, 120, 122 may also be preset to a desired level prior to being powered on. The distribution pattern of the light emitted through the broad side 106 of the LEP 102 may be different when one or more sets of LEDs 116, 118, 120, 122 are powered to emit light at a full (i.e., one hundred percent) intensity level instead of, for example, at a substantially less intensity level. For example, the first set of LEDs 116 and the second set of LEDs 118 may be dimmed to emit light at fifty percent of the respective full intensity level of each set of LEDs 116, 118. The distribution pattern of the light emitted through the broad side 106 of the LEP 102 is different when the first set of LEDs 116 and the second set of LEDs 118 are dimmed to emit light at fifty percent of their respective full intensity level as compared to when the first set of LEDs 116 and the second set of LEDs 118 emit light at their respective full intensity level.

In some example embodiments, the full intensity level of lights emitted by the four sets of LEDs 116, 118, 120, 122 may be substantially the same. In alternative embodiments, the full intensity level of light emitted by some of the sets of LEDs 116, 118, 120, 122 may be different from the full intensity level of light from the other sets of LEDs 116, 118, 120, 122. To illustrate, the full intensity level of lights from the first set of LEDs 116 and from the third set of LEDs 120 may be substantially different from the full intensity level of lights from the second set of LEDs 118 and from the fourth set of LEDs 122. For example, the full intensity level of light from each of the first set of LEDs 116 and the third set of LEDs 120 may be approximately fifty percent of the full intensity level of light from each of the second set of LEDs 118 and the fourth set of LEDs 122. As another example, the full intensity level of light from each of the first set of LEDs 116 and the third set of LEDs 120 may be approximately seventy five percent of the full intensity level of light from each of the second set of LEDs 118 and the fourth set of LEDs 122. By having different intensity levels of light emitted by the sets of LEDs 116, 118, 120, 122, a desired distribution pattern of the light emitted through the broad side 106 of the LEP 102 may be achieved.

In some example embodiments, each of the four sets of LEDs 116, 118, 120, 122 may emit light that has a full intensity level that is substantially different from the full intensity level of light emitted by all other sets of LEDs 116, 118, 120, 122. Thus, the distribution pattern of the light emitted through the broad side 106 may be changed by adjusting intensity of light emitting by one or more of the sets of LEDs 116, 118, 120, 122.

In some example embodiments, the intensity level of light that each set of LEDs 116, 118, 120, 122 emits may be fixed. For example, the lighting device 100 may be designed such that some of the sets of LEDs 116, 118, 120, 122 emit light approximately at a first fixed intensity level while the remaining sets of LEDs 116, 118, 120, 122 emit light approximately at a second fixed intensity level. To illustrate, one or more drivers may provide power to the sets of LEDs 116, 118, 120, 122 such that each of the sets of LEDs 116, 118, 120, 122 emits light that has an intensity level intended to achieve a desired light distribution pattern.

In some example embodiments, the intensity level of light from one or more of the set of LEDs 116, 118, 120, 122 may be set by a user, such as a consumer or a technician. To illustrate, a user may set the intensity level of light from each set of LEDs 116, 118, 120, 122 at time of installation to achieve a desired distribution pattern of the light emitted through the broad side of the LEP 102. For example, a user may power on one or more of the sets of LEDs 116, 118, 120, 122 and power off the remaining sets of LEDs 116, 118, 120, 122 to achieve a light distribution pattern that reduces the level of illumination of a particular part of the area around the lighting device 100. Further, to change the light distribution pattern, the user may adjust the intensity level of the one or more sets of LEDs that are powered on. As another example, a user may power on all four sets of LEDs 116, 118, 120, 122 and configure each set of LEDs to emit light that has a corresponding intensity level that results in a desired distribution pattern of the light emitted through the broad side of the LEP 102.

In some situations, several of the lighting device 100 may be installed in a particular area. For example, multiple of the lighting device 100 may be installed in parking lot. In such scenarios, the light distribution in the parking lot may depend on distribution of light from a number of the lighting devices. Thus, overall distribution of light in the parking lot may be controlled by adjusting the distribution of light from one or more of the lighting device while considering the effect of light emitted by the other lighting devices on the overall distribution of light.

Further, the distribution of light emitted through the broad side of the LEP 102 of the lighting device 100 may be considered in terms of the National Electrical Manufacturers Association (NEMA) light distribution standard and may be classified based on its NEMA type.

In some example embodiments, one or more sets of LEDs 116, 118, 120, 122 may be adjustable by a user to emit light that has a desired intensity level. In such embodiments, alternatively or in addition to setting intensity levels at time of installation, a user may adjust the intensity level of light from each set of LEDs 116, 118, 120, 122 after installation of the lighting device 100. To illustrate, after installation, a user may adjust the intensity level of light from each set of LEDs 116, 118, 120, 122 based on one or more factors, such as time of day and occupancy of the area around the lighting device 100. For example, a user may prefer that a portion of the area around the lighting device 100 is highly illuminated at all times while another portion of the area is highly illuminated only during a certain period of time. To achieve light distribution pattern that matches the user's illumination preference at different time periods, the user may, for example, power off or dim the light from one or more of the sets of LEDs 116, 118, 120, 122 as needed. Similarly, the user may power on or increase intensity of light from the one or more of the sets of LEDs 116, 118, 120, 122 as needed. In some example embodiments, a timer may be used to control the on-off powering and/or dimming operations.

In some example embodiments, two or more of the sets of LEDs 116, 118, 120, 122 may be controlled as a group. For example, the first set of LEDs 116 and the third set of LEDs 120 may be controlled using a single control means such as a dimmer and/or a switch. Similarly, the second set of LEDs 118 and the fourth set of LEDs 122 may be controlled using a single control means such as a dimmer and/or a switch. Although particular sets of LEDs are described as being controlled as a group, in alternative embodiments, various combinations of the sets of LEDs may be controlled as a group. Further, as it should be apparent from the above description, each of the four sets of LEDs 116, 118, 120, 122 may be independently controlled by a corresponding dimmer and/or on-off switch (e.g., a dual in-line (DIP) switch).

In some example embodiments, a single on-off switch may be used to power on and off all of the sets of LEDs 116, 118, 120, 122 while a dedicated dimmer is used to control a corresponding one of the sets of LEDs 116, 118, 120, 122. In general, different combinations of on-off switch and dimmer control arrangements may be implemented for different applications.

In some example embodiments, the sensor 105 may be coupled to a switch to control whether one or more of the sets of LEDs 116, 118, 120, 122 are turned on or off. For example, the sensor 105 may be a motion sensor 105 that senses motion (e.g., cars, pedestrians, etc.) and provides an indication signal to an on-off switch to control whether one or more of the sets of LEDs 116, 118, 120, 122 are powered on or off. Alternatively or in addition, the motion sensor 105 may also be coupled to a dimmer to control the intensity level of light emitted by one or more of the sets of LEDs 116, 118, 120, 122. Although the sensor 105 is shown attached to the LEP 102 of the lighting device 100, in alternative embodiments, the sensor 105 may be remotely located detached from the lighting device 100 or may be attached to another member of the lighting device 100.

In some example embodiments, the sensor 105 may include a light sensor (in addition or alternatively to a motion sensor) that is configured to detect light and provide a corresponding indication signal to an on-off switch to control whether one or more of the sets of LEDs 116, 118, 120, 122 are powered on or off. For example, some of the sets of LEDs may be powered on in response to the light sensor detecting low light level. Alternatively or in addition to being coupled to an on-off switch, the light sensor may also be coupled to a dimmer to control the intensity level of light emitted by one or more of the sets of LEDs 116, 118, 120, 122.

In some example embodiments, the frame 104 may hide the four sets of LEDs 116, 118, 120, and 122 from view, for example, at viewing angles below the lighting device 100. The frame 104 may also hide from view the outline of the perimeter of the LEP 104. In some example embodiments, the frame 104 may be made from aluminum, and may have aesthetic feature. The frame 104 may also be part of a heat management structure of the lighting device 100. Although the frame 104 has a substantially circular shape as shown in FIG. 1A, in alternative embodiments, the frame 104 may have other shapes without departing from the scope of this description.

Although the LEP 102 is shown in FIG. 1B as having an octagonal shape, in some alternative embodiments, the LEP 102 may have other shapes, including a rectangular shape, a V-shape, and a circular shape, without departing from the scope of this description. In general, the LEP 102 may have a polygon and other non-polygon shape and is not limited to the example shapes identified in this description and may have fewer or more than eight narrow sides. Each side of the LEP 102 may also be a straight or a curved side. Further, in some alternative embodiments, the lighting device 100 may include fewer or more than four sets of LEDs that emit light toward correspondingly narrow sides of the LEP 102. For example, the lighting device 100 may include one, two, three, five, or more sets of LEDs that are positioned proximal to a corresponding narrow side of the LEP 102 having an octagonal or another shape.

To illustrate, in some example embodiments, the LEP 120 may be a circular-shape LEP. For example, multiple LEDs may be positioned around the outer narrow perimeter of the circular-shape LEP, where each LED is controlled (i.e., powered on, power off, and/or adjusted for light intensity) individually. Alternatively several groups of LEDs may be positioned around the narrow outer perimeter of the circular-shape LEP, where each group of LEDs is controlled individually. By controlling individual LEDs or groups of LEDs, distribution of light emitted by the circular-shape LEP may be changed as desired. In an alternative embodiment, the circular-shape LEP may have a cut-out (e.g., a rectangular cut-out) through the broad sides of the circular-shape LEP and the LEDs may be positioned to emit light into the circular-shape LEP through the narrow side in the cut-out.

As another example, the LEP 102 may be a V-shaped LEP, and LEDs or other light sources that are controllable individually or in groups may be positioned, for example, in the valley of the V-shape.

Figure 2A:
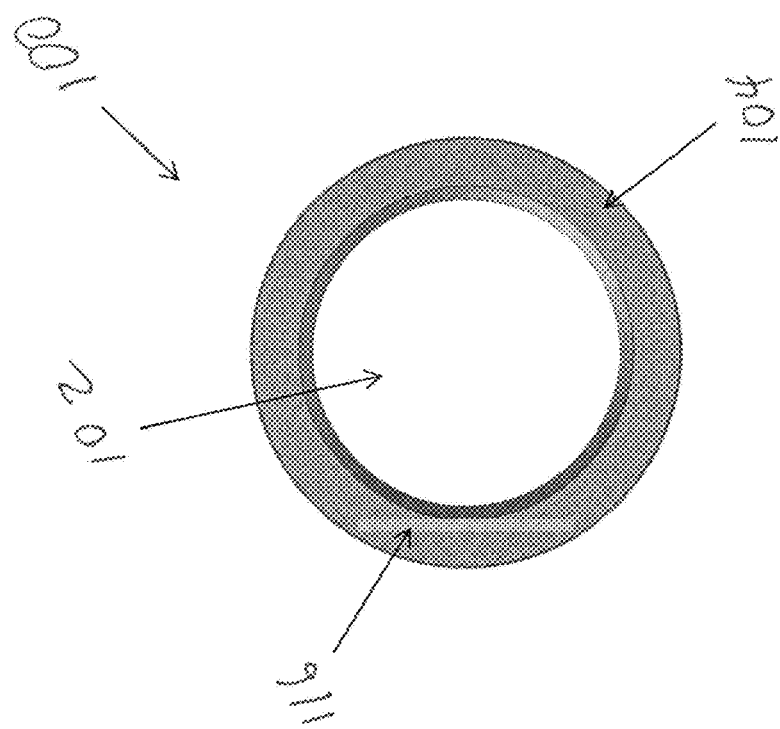
FIG. 2A illustrates the lighting device of FIG. 1A including a set of light emitting diodes (LEDs) that are powered on in accordance with an example embodiment.

FIG. 2A illustrates the lighting device 100 of FIG. 1A including a set of LEDs that are powered on in accordance with an example embodiment. FIG. 2B illustrates an Iso-footcandle plot that corresponds to the lighting device of FIG. 2A with a single set of LEDs powered on in accordance with an example embodiment. As illustrated in FIG. 2A, the first set of LEDs 116 are powered on while the other sets of LEDs 118, 120, 122 shown in FIG. 1B are powered off.

Each curve of the Iso-footcandle plot shown in FIG. 2B (as well as FIGS. 3B, 4B, 5B, 6B, and 7A-7D) represents locations on a viewing plane below the lighting device 100 that experience substantially the same light intensity level. The center 202 of the Iso-footcandle plot represents a position in the viewing plane that is directly below the lighting device 100. Thus, points on the plot that are farthest from the center 202 represent positions in the viewing plane that are farthest from the lighting device 100. Positions in the viewing plane that are represented by a particular curve experience a light intensity level that is approximately fifty percent of the light intensity level experienced by positions represented by an immediately adjacent inner curve.

As can be seen in FIG. 2B, when the first set of LEDs 116 are powered on and the other sets of LEDs 118, 120, 122 are powered off, some locations in the viewing plane that are at substantially equal distances from the lighting device 100 may experience different levels of light intensity. To illustrate, some positions on the right side of the lighting device 100 but that are farther away than closer positions on the left side of the lighting device 100 may experience relatively higher levels of light intensity than the closer positions that are on the left side of the lighting device 100. For example, the farthest right position 204 on the outer most curve 202 experiences the same level of light intensity as the farthest left position 206 on the curve even though the farthest right position 206 is approximately twice as far from the center 202 of lighting device 100 as the farthest left position.

Accordingly, the lighting device 100 may be set to have only the first set of LEDs 116 powered on when a desired light distribution pattern corresponds to the pattern illustrated in FIG. 2B.

Figures 3A, 3B:
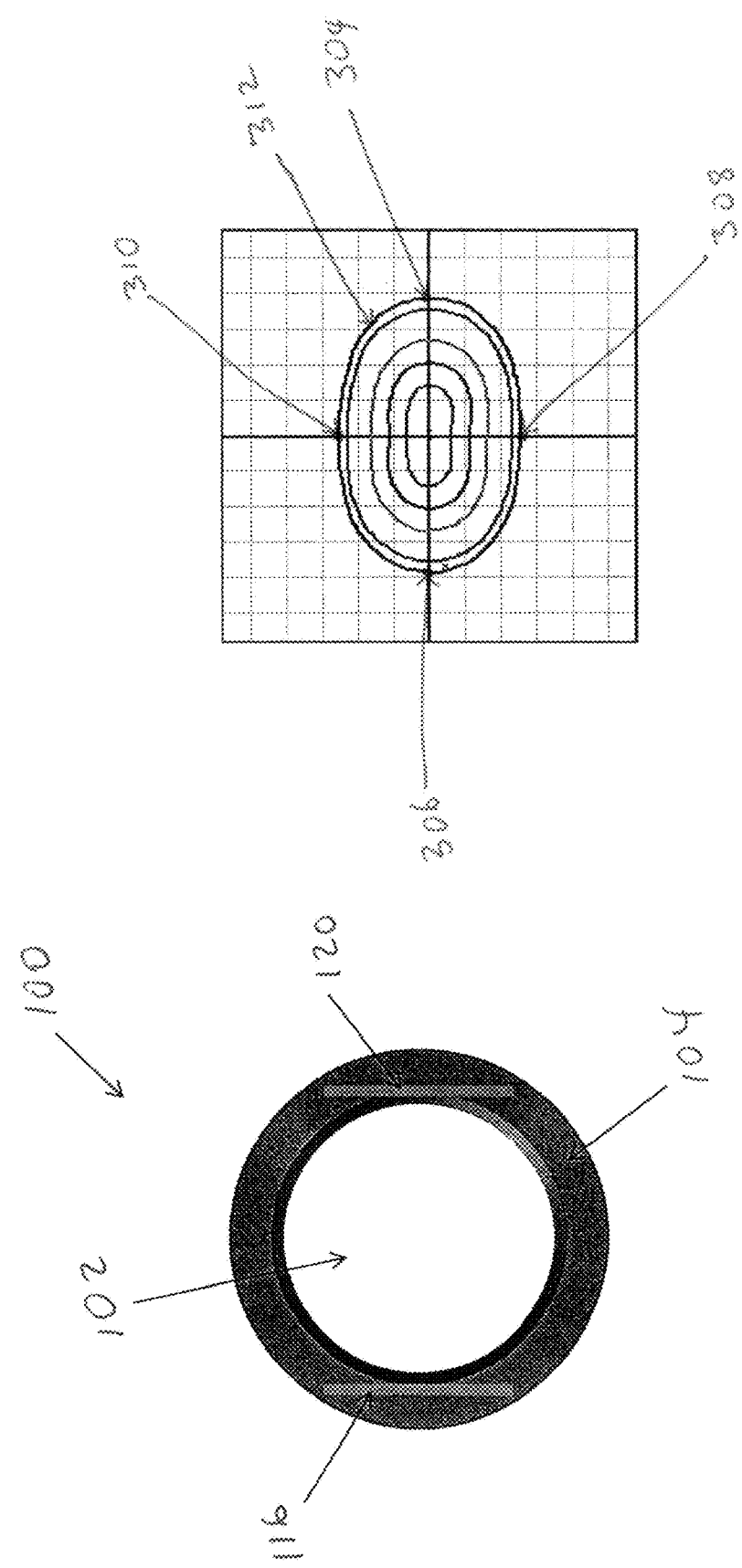
FIG. 3A illustrates the lighting device of FIG. 1A including two sets of LEDs that are powered on in accordance with an example embodiment.
FIG. 3B illustrates an Iso-footcandle plot that corresponds to the lighting device of FIG. 3A in accordance with an example embodiment.

FIG. 3A illustrates the lighting device of FIG. 1A including two sets of LEDs that are powered on in accordance with an example embodiment. FIG. 3B illustrates an Iso-footcandle plot that corresponds to the lighting device of FIG. 3A in accordance with an example embodiment.

As illustrated in FIG. 3A, the first set of LEDs 116 and the third set of LEDs 120 are powered on and the other sets of LEDs 118, 122 are powered off. As can be seen in FIG. 3B, some locations in the viewing plane that are at substantially equal distances from the lighting device 100 may experience different levels of light intensity while others locations in the viewing plane that are at equal distance from the lighting device 100 may experience substantially the same level of light intensity. Further, locations in the viewing plane that are at different distances from the lighting device 100 may experience substantially the same level of light intensity. To illustrate, the farthest right position 304 on the outer most curve 312 and the farthest left position 306 on the outer most curve 312, which are substantially at equal distance from the lighting device 100, experience substantially the same level of light intensity. Similarly, the farthest back position 308 and the farthest front position 310 on the outermost curve 312, which are at substantially equal distance from the lighting device 100, experience substantially the same level of light intensity. However, the farthest right position 304 and the farthest left position 306 experience substantially the same level of light intensity as the farthest back position 308 and the farthest front position 310 even though the farthest right position 304 and the farthest left position 306 are significantly farther away from the lighting device 100 than the farthest back position 308 and the farthest front position 310.

Accordingly, the lighting device 100 may be set to have the first set of LEDs 116 and the third set of LEDs 120 powered on and the other sets of LEDs 118, 122 powered off when a desired light distribution pattern of the lighting device 100 corresponds to the pattern illustrated in FIG. 3B.

Figure 4B:
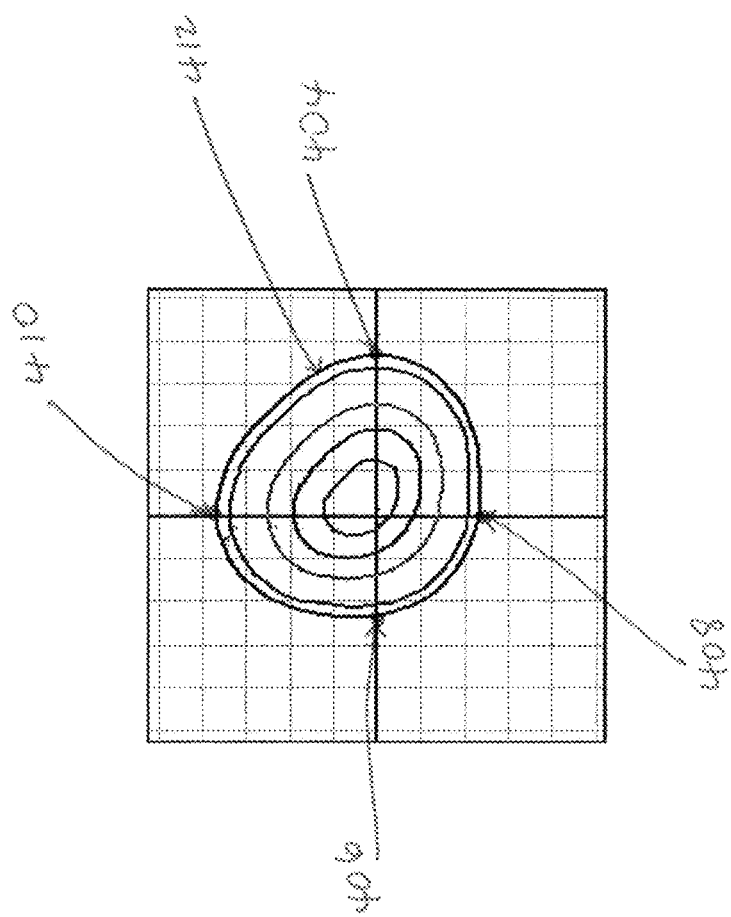
FIG. 4B illustrates an Iso-footcandle plot that corresponds to the lighting device of FIG. 4A in accordance with an example embodiment.
Figure 4A:
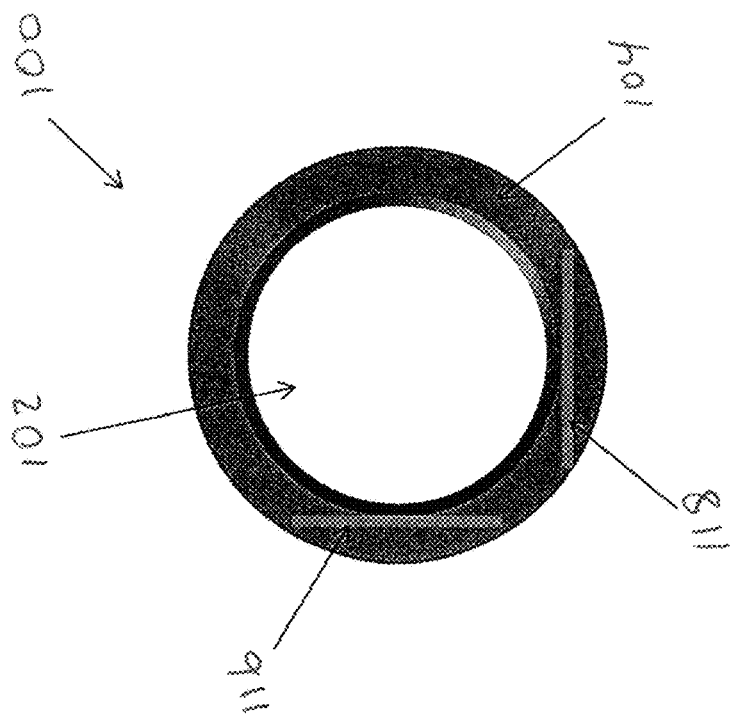
FIG. 4A illustrates the lighting device of FIG. 1A including two sets of LEDs that are powered on in accordance with another example embodiment.

FIG. 4A illustrates the lighting device of FIG. 1A including two sets of LEDs that are powered on in accordance with another example embodiment. FIG. 4B illustrates an Iso-footcandle plot that corresponds to the lighting device of FIG. 4A in accordance with an example embodiment.

As illustrated in FIG. 4A, the first set of LEDs 116 and the second set of LEDs 118 are powered on and the other sets of LEDs 120, 122 are powered off. As can be seen in FIG. 4B, some locations in the viewing plane that are at substantially equal distances from the lighting device 100 may experience different levels of light intensity while others locations in the viewing plane that are equal distance from the lighting device 100 may experience substantially the same level of light intensity. Further, locations in the viewing plane that are at different distances from the lighting device 100 may experience substantially the same level of light intensity. To illustrate, the farthest right position 404 on the outer most curve 412 and the farthest left position 406 on the outer most curve 412, which are at substantially different distances from the lighting device 100, experience substantially the same level of light intensity. Similarly, the farthest back position 408 and the farthest front position 410 on the outermost curve 412, which are substantially at substantially different distances from the lighting device 100, experience substantially the same level of light intensity. However, the farthest right position 404 and the farthest front position 410, which are at substantially equal distance from the lighting device 100, experience substantially the same level of light intensity.

Accordingly, the lighting device 100 may be set to have the first set of LEDs 116 and the second set of LEDs 118 powered on and the other sets of LEDs 120, 122 powered off when a desired light distribution pattern of the lighting device 100 corresponds to the pattern illustrated in FIG. 4B. Even though only two of the sets of LEDs are powered on in both FIGS. 3A and 4A, the light distribution patterns that correspond to FIGS. 3A and 4A are significantly different from each other as can be clearly seen by comparing the corresponding Iso-footcandle plots shown in FIGS. 3B and 4B.

Figure 5B:
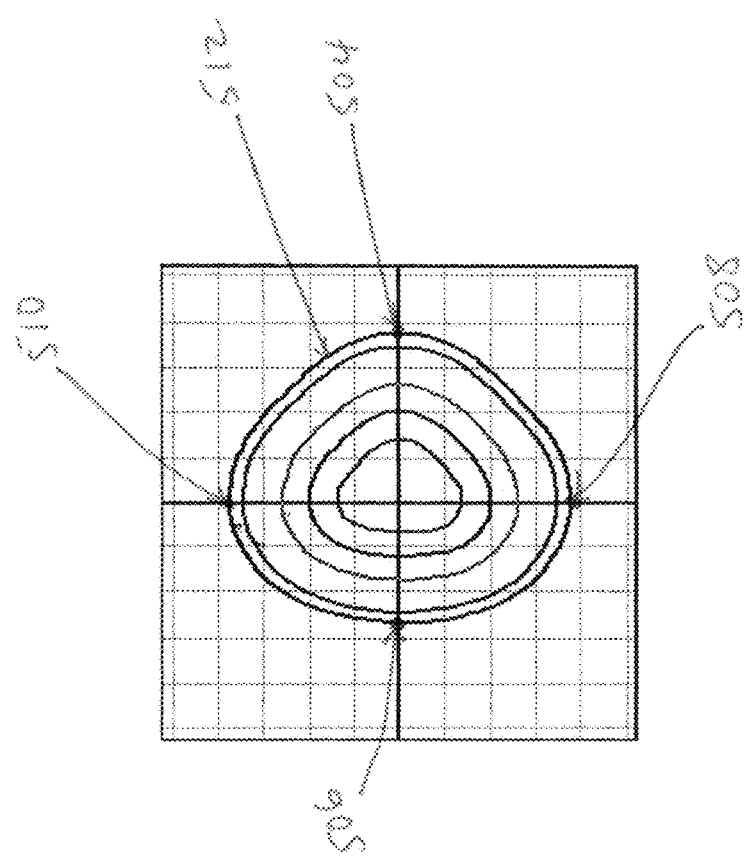
FIG. 5B illustrates an Iso-footcandle plot that corresponds to the lighting device of FIG. 5A in accordance with an example embodiment.
Figure 5A:
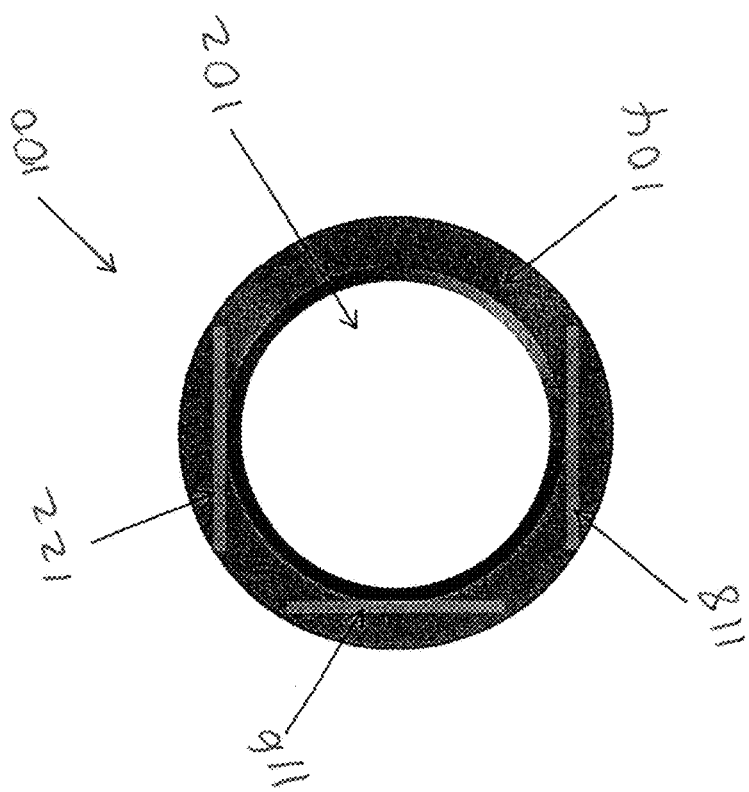
FIG. 5A illustrates the lighting device of FIG. 1A including three sets of LEDs that are powered on in accordance with an example embodiment.

FIG. 5A illustrates the lighting device of FIG. 1A including three sets of LEDs that are powered on in accordance with an example embodiment. FIG. 5B illustrates an Iso-footcandle plot that corresponds to the lighting device of FIG. 5A in accordance with an example embodiment.

As illustrated in FIG. 5A, the first set of LEDs 116, the second set of LEDs 118, and the fourth set of LEDs 120 are powered on and the third set of LEDs 120 are powered off. As can be seen in FIG. 5B, some locations in the viewing plane that are at different distances from the lighting device 100 may experience substantially the same level of light intensity. To illustrate, the farthest right position 504, the farthest back position 508 on the same curve, and the farthest front position 510, which are all on the same curve 512 and significantly farther from the lighting device 100 than the farthest left position 506, experience substantially the same level of light intensity as the farthest left position 506. Further, the farthest right position 504, the farthest back position 508, and the farthest front position 510, which all are at approximately equal distances from the lighting device 100, experience substantially the same level of light intensity. An overall comparison of the Iso-footcandle plots of FIGS. 3B, 4B, and 5B shows, the distribution pattern of the light represented by the Iso-footcandle plot of FIG. 5B is different from the light distribution patterns represented by the Iso-footcandle plots of FIGS. 3B and 4B.

Accordingly, as illustrated in FIG. 5A, the lighting device 100 may be set to have the first set of LEDs 116, the second set of LEDs 118, and the fourth set of LEDs 120 powered on and the third set of LEDs 120 powered off when a desired light distribution pattern of the lighting device 100 corresponds to the pattern illustrated in FIG. 5B.

Figure 6B:
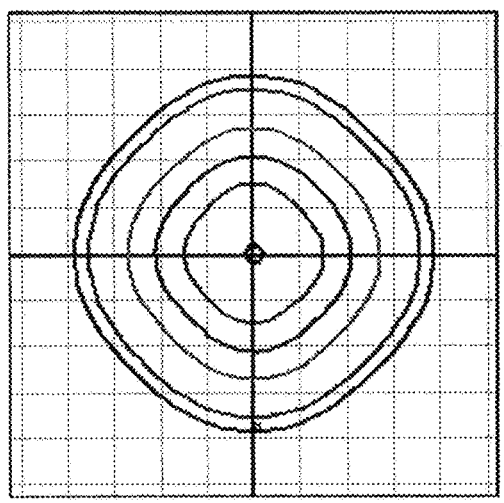
FIG. 6B illustrates an Iso-footcandle plot that corresponds to the lighting device of FIG. 6A in accordance with an example embodiment.
Figure 6A:
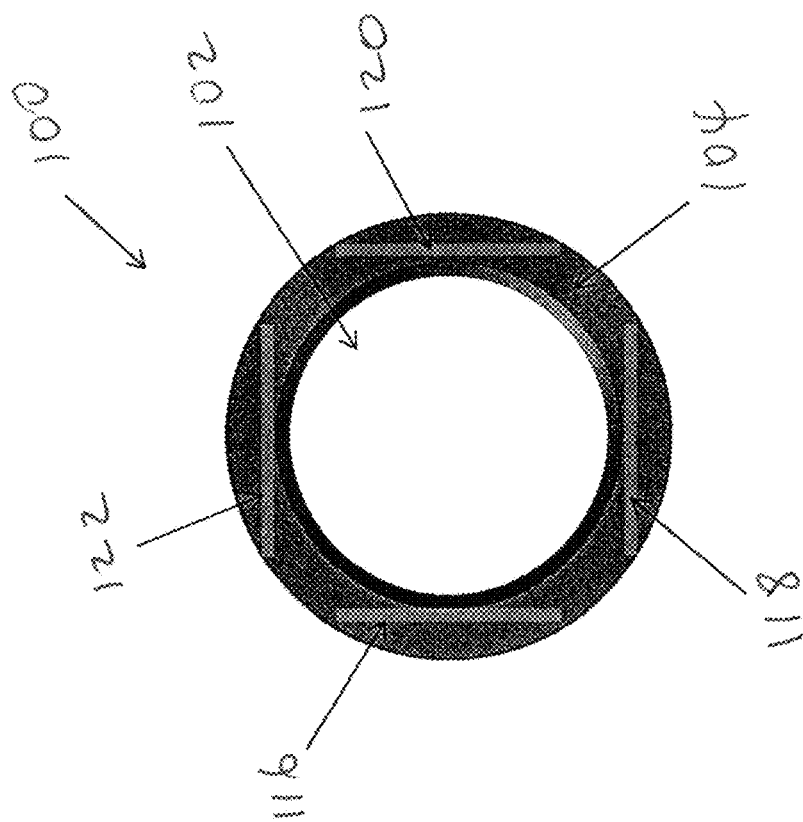
FIG. 6A illustrates the lighting device of FIG. 1A including four sets of LEDs that are powered on in accordance with an example embodiment.

FIG. 6A illustrates the lighting device of FIG. 1A including four sets of LEDs that are powered on in accordance with an example embodiment. FIG. 6B illustrates an Iso-footcandle plot that corresponds to the lighting device of FIG. 6A in accordance with an example embodiment. As illustrated in FIG. 6A, all four sets of LEDs 116, 118, 120, 122 are powered on. As can be seen in FIG. 6B, unlike the light distribution pattern illustrated in FIGS. 3B, 4B, and 5B, all locations in the viewing plane that are substantially equally distanced from the lighting device 100 experience substantially the same level of light intensity. In addition, the overall distribution pattern of the light represented by the Iso-footcandle plot of FIG. 6B is different from the light distribution patterns represented by the Iso-footcandle plots of FIGS. 3B, 4B, and 5B.

FIGS. 7A-7D are Iso-footcandle plots illustrating effects of different intensity levels of lights from different light sources on the light distribution pattern of a lighting device in accordance with an example embodiment. For illustrative purposes, the inner curve in each of the Iso-footcandle plots of FIGS. 7A-7D may be a 0.2 foot-candle (fc) curve, and the outer curve may be a 0.1 fc curve.

Figure 7A:
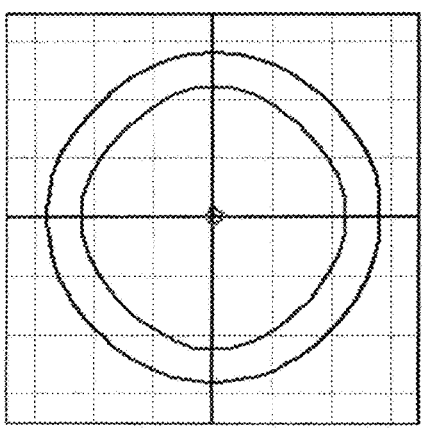
FIGS. 7A-7D are Iso-footcandle plots illustrating effects of different intensity levels of light from different light sources on the light distribution pattern of a lighting device in accordance with an example embodiment.
Figure 7B:
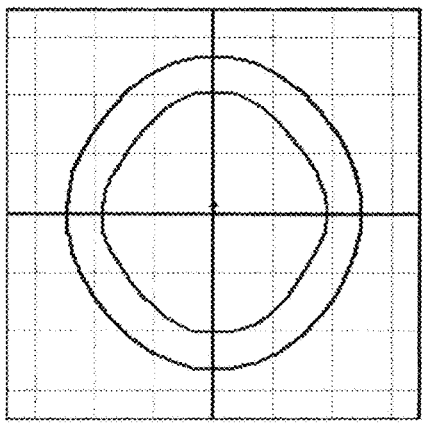
Figure 7C:
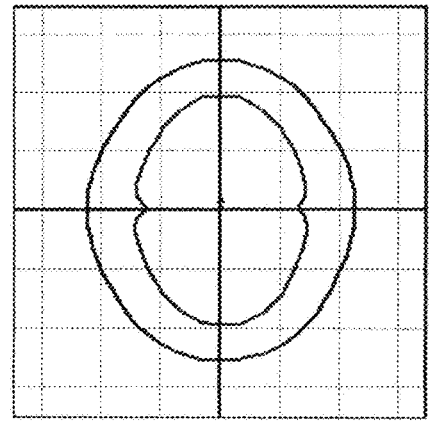
Figure 7D:
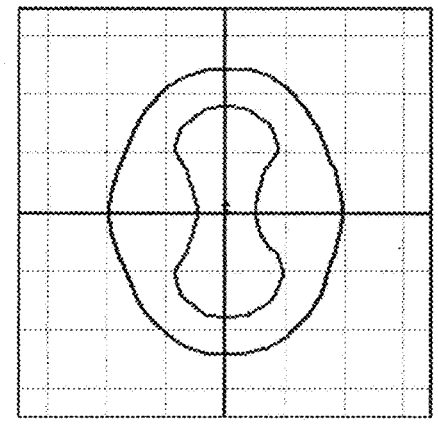

In an example embodiment, the Iso-footcandle plot on FIG. 7A corresponds to the lighting device 100 illustrated in FIG. 6A, where all four sets of LEDs 116, 118, 120, 122 are powered on. For example, the Iso-footcandle plot on FIG. 7A may correspond to all four sets of LEDs 116, 118, 120, 122 emitting light that are each substantially at a full intensity level. In some example embodiments, the Iso-footcandle plot on FIG. 7B may correspond to the lighting device 100 illustrated in FIG. 6A, where the first set of LEDs 116 and the third set of LEDs 120 emit light at substantially full intensity level, and where the second set of LEDs 118 and the fourth set of LEDs 122 emit light at substantially fifty percent of the full intensity level. In some example embodiments, the Iso-footcandle plot on FIG. 7C may correspond to the lighting device 100 illustrated in FIG. 6A, where the first set of LEDs 116 and the third set of LEDs 120 emit light at substantially full intensity level, and where the second set of LEDs 118 and the fourth set of LEDs 122 emit light at substantially twenty five percent of the full intensity level. In some example embodiments, the Iso-footcandle plot on FIG. 7D may correspond to the lighting device 100 illustrated in FIG. 3A, where the first set of LEDs 116 and the third set of LEDs 120 emit light at a substantially full intensity level, and where the second set of LEDs 118 and the fourth set of LEDs 122 are powered off (alternatively, dimmed to substantially zero percent of the full intensity level).

As comparison of the Iso-footcandle plots of FIGS. 7A-7D illustrates, changes in the intensity level of light emitted by two of the sets of LEDs 116, 118, 120, 122 affects the light distribution pattern of the lighting device 100. Accordingly, the lighting device 100 may be configured to emit light that has a particular light distribution pattern by setting or adjusting one or more of the sets of LEDs 116, 118, 120, 122 to emit a light that has a particular level of intensity.

Although FIGS. 7A-7D are described with respect to four sets of LEDs where intensity level of light from two of the four sets of LEDs are set or adjusted, in alternative embodiments, only one or more than two of the four sets may be set and/or adjusted to emit light so that each have particular levels of intensity to produce a particular distribution pattern of the light from the lighting device 100. Further, as described above, in some alternative embodiments, the lighting device 100 may have fewer or more than four sets of LEDs. In addition, although particular levels of light intensity are described, the intensity of light from each set of LEDs may be adjusted to have a level ranging between a full intensity level and substantially being powered off. Further, as described above, in some example embodiments, the level of light intensity of light from each set of LEDs may be independently controlled.

Figure 8:
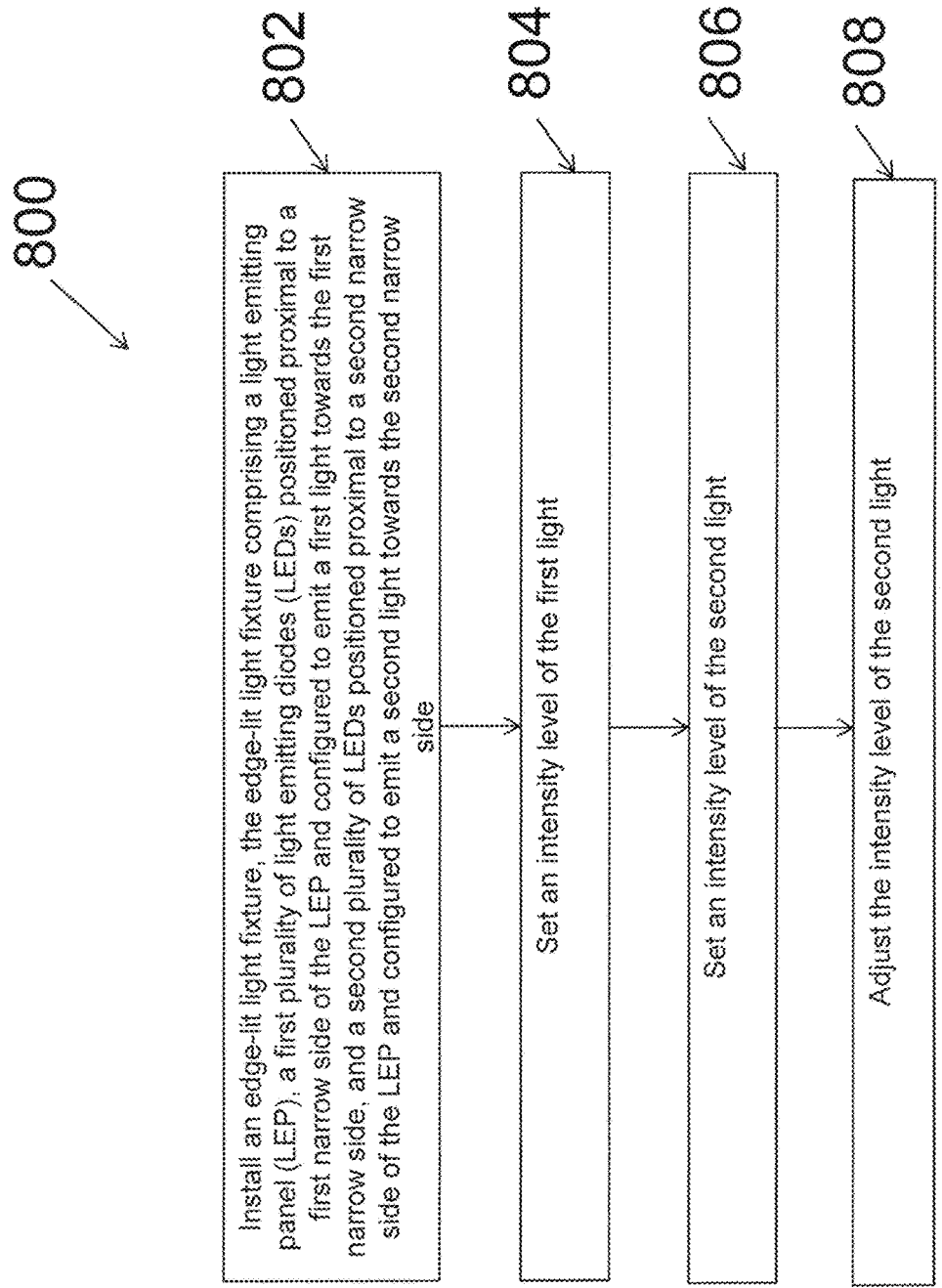
FIG. 8 is a flowchart illustrating a method of controlling light distribution of the edge-lit lighting device of FIG. 1A in accordance with an example embodiment.

FIG. 8 is a flowchart illustrating a method of controlling light distribution pattern of an edge-lit lighting device in accordance with an example embodiment. The method 800 includes installing an edge-lit lighting device, at step 802. For example, a technician may install the edge-lit lighting device, such as the edge-lit lighting device 100 of FIG. 1A. To illustrate, the edge-lit lighting device may include a light emitting panel (LEP), a first plurality of light emitting diodes (LEDs) positioned proximal to a first narrow side of the LEP and configured to emit a first light toward the first narrow side, and a second plurality of LEDs positioned proximal to a second narrow side of the LEP and configured to emit a second light toward the second narrow side. For example, the first plurality of LEDs may correspond to the first set of LEDs 116 of FIG. 1B. Similarly, the second plurality of LEDs may correspond to, for example, the second set of LEDs 118 or the third set of LEDs 120 of FIG. 1B.

The method 800 further includes setting an intensity level of the first light, at step 804. For example, the first plurality of LEDs may be set to emit light at a full intensity level. The method 800 also includes setting an intensity level of the second light, at step 806. For example, the second plurality of LEDs may be set to emit light at a full intensity level as well. Alternatively, the second plurality of LEDs may be set to emit light at approximately fifty percent of the full intensity level.

In some example embodiments, the method 800 also includes adjusting the intensity level of the first light, at step 808. For example, adjusting the intensity level of the first light may include dimming the first light. Alternatively or in addition, the method 800 may also include adjusting the intensity level of the second light.

Although particular embodiments have been described herein in detail, the descriptions are by way of example. The features of the embodiments described herein are representative and, in alternative embodiments, certain features, elements, and/or steps may be added or omitted. Additionally, modifications to aspects of the embodiments described herein may be made by those skilled in the art without departing from the spirit and scope of the following claims, the scope of which are to be accorded the broadest interpretation so as to encompass modifications and equivalent structures.

What is claimed is:

1. An edge-lit lighting fixture, comprising:
   a light emitting panel (LEP);
   a first light emitting diode (LED) light source positioned proximal to a narrow outer perimeter edge of the LEP and configured to emit a first light into the LEP through the narrow outer perimeter edge, the first light having a first intensity level;
   a second LED light source positioned proximal to the narrow outer perimeter edge of the LEP and configured to emit a second light into the LEP through the narrow outer perimeter edge, the second light having a second intensity level, wherein the first LED light source and the second LED light source are positioned at different locations proximal to the narrow outer perimeter edge of the LEP; and a motion sensor positioned at a broad surface of the LEP to detect a motion in an area, wherein the first LED light source and the second LED light source are powered on based on the motion sensor, and wherein the edge-lit lighting fixture is configured to provide an illumination light that illuminates the area through the broad surface of the LEP, the illumination light resulting from the first light and the second light that are emitted into the LEP through the narrow outer perimeter edge of the LEP.

2. The edge-lit lighting fixture of claim 1, wherein the LEP has a circular shape.

3. The edge-lit lighting fixture of claim 2, wherein the motion sensor is positioned at a center of the broad surface of the LEP.

4. The edge-lit lighting fixture of claim 1, wherein the first LED light source and the second LED light source are positioned opposite to each other with respect to the LEP.

5. The edge-lit lighting fixture of claim 1, wherein the first LED light source and the second LED light source are positioned approximately 90 degrees from each other with respect to a center of the LEP.

6. The edge-lit lighting fixture of claim 1, further comprising a frame positioned adjacent the narrow outer perimeter edge of the LEP.

7. The edge-lit lighting fixture of claim 6, wherein the frame has a circular outer perimeter and a circular inner perimeter, wherein the first LED light source and the second LED light source are covered from view by the frame from below the edge-lit lighting fixture.

8. The edge-lit lighting fixture of claim 1, wherein the first intensity level and the second intensity level are different from each other.

9. The edge-lit lighting fixture of claim 1, wherein the first intensity level and the second intensity level are adjustable to intensity levels that are different from each other, and wherein a distribution pattern of the illumination light is changeable by adjusting one of the first intensity level and the second intensity level.

10. The edge-lit lighting fixture of claim 1, wherein the LEP has a polygon shape.

11. An edge-lit lighting fixture, comprising:
a light emitting panel (LEP);
a first light emitting diode (LED) light source positioned proximal to a narrow outer perimeter edge of the LEP and configured to emit a first light into the LEP through the narrow outer perimeter edge;
a second LED light source positioned proximal to the narrow outer perimeter edge of the LEP and configured to emit a second light into the LEP through the narrow outer perimeter edge, wherein the first LED light source and the second LED light source are positioned at different locations proximal to the narrow outer perimeter edge of the LEP; and a motion sensor positioned at a broad surface of the LEP to detect a motion in an area, wherein the first LED light source and the second LED light source are powered on based on the motion sensor and wherein the edge-lit lighting fixture provides an illumination light that illuminates the area through the broad surface of the LEP, the illumination light resulting from the first light and the second light that are emitted into the LEP through the narrow outer perimeter edge of the LEP.

12. The edge-lit lighting fixture of claim 11, further comprising a frame positioned adjacent the narrow outer perimeter edge of the LEP.

13. The edge-lit lighting fixture of claim 12, wherein the motion sensor and at least a portion of the broad surface of the LEP are viewable from below the edge-lit lighting fixture.

14. The edge-lit lighting fixture of claim 13, wherein the first LED light source and the second LED light source are hidden from view by the frame from below the edge-lit lighting fixture.

15. The edge-lit lighting fixture of claim 11, wherein the LEP has a circular shape.

16. The edge-lit lighting fixture of claim 11, wherein the LEP has a polygon shape.

17. An edge-lit lighting fixture, comprising:
a light emitting panel (LEP) having a broad surface and a narrow outer perimeter edge around the broad surface;
light emitting diode (LED) light sources, wherein each LED light source of the LED light sources is positioned at a respective location proximal to the narrow outer perimeter edge of the LEP and oriented to emit a respective light into the LEP through the narrow outer perimeter edge of the LEP;
a frame having a circular inner perimeter and a circular outer perimeter, wherein the frame is positioned adjacent the narrow outer perimeter of the LEP; and
a motion sensor positioned at the broad surface of the LEP to detect a motion in an area, wherein a first LED light source and a second LED light source are powered on based on the motion sensor, and wherein the edge-lit lighting fixture provides an illumination light that illuminates the area, the illumination light resulting from the respective lights emitted into the LEP through the narrow outer perimeter edge of the LEP.

18. The edge-lit lighting fixture of claim 17, wherein the broad surface of the LEP is exposed for view from below the edge-lit lighting fixture.

19. The edge-lit lighting fixture of claim 18, wherein the LED light sources are hidden from view by the frame from below the edge-lit lighting fixture.

20. The edge-lit lighting fixture of claim 18, wherein the LEP has a circular shape or a polygon shape.

* * * * *